(12) United States Patent
Kimura et al.

(10) Patent No.: US 11,165,858 B2
(45) Date of Patent: Nov. 2, 2021

(54) SERVER SELECTION APPARATUS, SERVER SELECTION METHOD AND PROGRAM

(71) Applicant: Nippon Telegraph and Telephone Corporation, Tokyo (JP)

(72) Inventors: Takuto Kimura, Tokyo (JP); Arifumi Matsumoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/966,714

(22) PCT Filed: Feb. 4, 2019

(86) PCT No.: PCT/JP2019/003881
§ 371 (c)(1),
(2) Date: Jul. 31, 2020

(87) PCT Pub. No.: WO2019/156026
PCT Pub. Date: Aug. 15, 2019

(65) Prior Publication Data
US 2021/0037088 A1 Feb. 4, 2021

(30) Foreign Application Priority Data
Feb. 6, 2018 (JP) .............................. JP2018-019418

(51) Int. Cl.
*G06F 15/16* (2006.01)
*H04L 29/08* (2006.01)

(52) U.S. Cl.
CPC ................................. *H04L 67/101* (2013.01)

(58) Field of Classification Search
CPC ............... H04L 67/101; H04L 67/1004; H04L 67/1008; H04L 67/1002; H04L 67/1012; H04L 67/1023
(Continued)

(56) References Cited

U.S. PATENT DOCUMENTS

| 7,716,332 B1 * | 5/2010 | Topfl | G06F 16/9574 |
| | | | 709/226 |
| 9,826,086 B2 * | 11/2017 | Zhang | H04M 3/367 |

(Continued)

OTHER PUBLICATIONS

Cedezis.com, [online], "Openmix Always Knows the Ideal Delivery Option," 2017, retrieved on Dec. 15, 2017, retrieved from URL<https://www.cedexis.com/opemnix/>, 8 pages.
(Continued)

*Primary Examiner* — Bharat Barot
(74) *Attorney, Agent, or Firm* — Fish & Richardson P.C.

(57) ABSTRACT

A server selection device includes: an acquisition unit that acquires communication environment information indicating communication environment and quality information indicating communication quality for each of communications made regarding each of a plurality of servers that are candidates for distribution of content to a client; a calculator that calculates a score reflecting probabilistic deterioration in communication quality for each of combinations between a server and communication environment information based on a history of the communication environment information and the quality information acquired by the acquisition unit; and a selector that selects a server to deliver content to the client based on the score calculated by the calculator, thereby enabling the selection of a server less likely to affect the quality of experience.

12 Claims, 11 Drawing Sheets

(58) Field of Classification Search
USPC .......................... 709/202–203, 235; 718/105
See application file for complete search history.

(56) References Cited

U.S. PATENT DOCUMENTS

| | | | | |
|---|---|---|---|---|
| 9,900,252 | B2* | 2/2018 | Chiong | H04L 47/125 |
| 9,906,422 | B2* | 2/2018 | Jalan | H04L 43/0817 |
| 10,412,182 | B2* | 9/2019 | Takeshita | H04L 67/22 |
| 2003/0084089 | A1* | 5/2003 | Kurose | H04L 67/1002 |
| | | | | 709/200 |
| 2017/0195202 | A1* | 7/2017 | Yamasaki | H04L 67/10 |
| 2018/0159920 | A1* | 6/2018 | Yan | H04L 67/101 |
| 2018/0376176 | A1* | 12/2018 | Matsumoto | H04N 21/2402 |

OTHER PUBLICATIONS

Liu et al., "A Case for a Coordinated Internet Video Control Plane," Proceedings of the ACM SIGCOMM 2012 Conference on Applications, Technologies, Architectures, and Protocols for Computer Communication, Aug. 2012, pp. 359-370.

Wamser et al., "Server and Content Selection for MPEG DASH Video Streaming with Client Information," Internet QoE, Aug. 2017, pp. 19-24.

* cited by examiner

Fig. 3

| URL | IP ADDRESS OF ACCESS DESTINATION | |
|---|---|---|
| http://aaa.com | 11.11.11.11 | ⎫ |
| http://aaa.com | 22.22.22.22 | ⎬ SERVER CANDIDATES FOR http://aaa.com |
| http://aaa.com | 33.33.33.33 | ⎭ |
| http://bbb.com | 44.44.44.44 | ⎫ SERVER CANDIDATES FOR http://bbb.com |
| http://bbb.com | 11.11.11.11 | ⎭ |

Fig. 4

| ITEM NO. | SERVER | ELEMENT 1 | ELEMENT 2 | ELEMENT 3 | SCORE |
|---|---|---|---|---|---|
| 1 | 11.11.11.11 | Carrier A | eNB A | Cell A | 20 |
| 2 | 11.11.11.11 | Carrier A | eNB A | * | 60 |
| 3 | 11.11.11.11 | Carrier A | * | * | 50 |
| 4 | 11.11.11.11 | * | * | * | 20 |
| 5 | 22.22.22.22 | Carrier A | eNB A | Cell A | 80 |
| 6 | 22.22.22.22 | Carrier A | eNB A | * | 50 |
| 7 | 22.22.22.22 | Carrier A | * | * | 200 |
| 8 | 22.22.22.22 | * | * | * | 12 |
| 9 | 33.33.33.33 | Carrier A | eNB A | Cell A | 50 |
| 10 | 33.33.33.33 | Carrier A | eNB A | * | 20 |
| 11 | 33.33.33.33 | Carrier A | * | * | 10 |
| 12 | 33.33.33.33 | * | * | * | 40 |

Fig. 5

| ITEM NO. | ACCESS TIME | IP ADDRESS OF ACCESS DESTINATION | URL OF ACCESS DESTINATION | COMMUNICATION ENVIRONMENT INFORMATION | | | DELAY (ms) | THROUGHPUT (Kbps) | ... |
|---|---|---|---|---|---|---|---|---|---|
| | | | | ELEMENT 1 | ELEMENT 2 | ELEMENT 3 | | | |
| 1 | 2018.1.1 12:59:27 | 11.11.11.11 | http://aaa-1.com | Carrier A | eNB A | Cell A | 10 | 1000 | |
| 2 | 2018.1.1 13:00:11 | 11.11.11.11 | http://aaa-1.com | Carrier A | eNB A | Cell A | 5 | 2500 | |
| 3 | 2018.1.1 13:00:18 | 11.11.11.11 | http://aaa-1.com | Carrier A | eNB A | Cell A | 200 | 600 | |
| 4 | 2018.1.1 13:01:10 | 11.11.11.11 | http://aaa-1.com | Carrier A | eNB A | Cell A | 200 | 400 | |
| 5 | 2018.1.1 13:01:18 | 11.11.11.11 | http://aaa-1.com | Carrier A | eNB A | Cell B | 10 | 2000 | |
| 6 | 2018.1.1 13:05:28 | 11.11.11.11 | http://aaa-1.com | Carrier A | eNB B | Cell C | 300 | 500 | |
| 7 | 2018.1.1 13:10:22 | 11.11.11.11 | http://aaa-1.com | Carrier A | eNB B | Cell C | 300 | 500 | |
| 8 | 2018.1.1 13:15:27 | 22.22.22.22 | http://bbb-1.com | Carrier A | eNB A | Cell A | 10 | 1300 | |
| 9 | 2018.1.1 13:20:32 | 11.11.11.11 | http://aaa-1.com | Carrier A | lat A | long A | 15 | 1200 | |
| ... | ... | ... | ... | ... | ... | ... | ... | ... | |

Fig. 6

| | SERVER | ELEMENT 1 | ELEMENT 2 | ELEMENT 3 |
|---|---|---|---|---|
| A { | SERVER A | Carrier A | eNB A | Cell A |
| | SERVER A | Carrier A | eNB A | * |
| | SERVER A | Carrier A | * | * |
| | SERVER A | * | * | * |
| I { | SERVER B | Carrier A | lat A | long A |
| | SERVER B | Carrier A | * | * |
| | SERVER B | * | * | * |
| FIXED SYSTEM LINE { | SERVER C | ISP A | area A | |
| | SERVER C | ISP A | * | |
| | SERVER C | * | * | |

Fig. 7

| URL | URL OF ACCESS DESTINATION | |
|---|---|---|
| http://aaa.com | http://aaa-1.com | ⎫ SERVER CANDIDATES FOR http://aaa.com |
| http://aaa.com | http://aaa-2.com | |
| http://aaa.com | http://aaa-3.com | ⎭ |
| http://bbb.com | http://aaa-1.com | ⎫ SERVER CANDIDATES FOR http://bbb.com |
| http://bbb.com | http://bbb-1.com | ⎭ |

Fig. 8

| ITEM NO. | SERVER | ELEMENT 1 | ELEMENT 2 | ELEMENT 3 | SCORE |
|---|---|---|---|---|---|
| 1 | http://aaa-1.com | Carrier A | eNB A | Cell A | 20 |
| 2 | http://aaa-1.com | Carrier A | eNB A | * | 60 |
| 3 | http://aaa-1.com | Carrier A | * | * | 50 |
| 4 | http://aaa-1.com | * | * | * | 20 |
| 5 | http://aaa-2.com | Carrier A | eNB A | Cell A | 80 |
| 6 | http://aaa-2.com | Carrier A | eNB A | * | 50 |
| 7 | http://aaa-2.com | Carrier A | * | * | 200 |
| 8 | http://aaa-2.com | * | * | * | 12 |
| 9 | http://aaa-3.com | Carrier A | eNB A | Cell A | 50 |
| 10 | http://aaa-3.com | Carrier A | eNB A | * | 20 |
| 11 | http://aaa-3.com | Carrier A | * | * | 10 |
| 12 | http://aaa-3.com | * | * | * | 40 |

Fig. 10

PLAYLIST BEFORE REWRITE

EXTM3U
EXT-X-TARGETDURATION:10
EXT-X-VERSION:3
EXT-X-MEDIA-SEQUENCE:0
EXT-X-PLAYLIST-TYPE:VOD
EXTINF:9.97663,
http://hoge.com/media-0.ts
EXTINF:9.97663,
http://hoge.com/media-1.ts
EXTINF:7.10710,
http://hoge.com/media-2.ts
EXT-X-ENDLIST

PLAYLIST AFTER REWRITE

EXTM3U
EXT-X-TARGETDURATION:10
EXT-X-VERSION:3
EXT-X-MEDIA-SEQUENCE:0
EXT-X-PLAYLIST-TYPE:VOD
EXTINF:9.97663,
http://fuga.com/media-0.ts
EXTINF:9.97663,
http://fuga.com/media-1.ts
EXTINF:7.10710,
http://fuga.com/media-2.ts
EXT-X-ENDLIST

SERVER SELECTION APPARATUS, SERVER SELECTION METHOD AND PROGRAM

CROSS-REFERENCE TO RELATED APPLICATIONS

This application is a National Stage application under 35 U.S.C. § 371 of International Application No. PCT/JP2019/003881, having an International Filing Date of Feb. 4, 2019, which claims priority to Japanese Application Serial No. 2018-019418, filed on Feb. 6, 2018. The disclosure of the prior application is considered part of the disclosure of this application, and is incorporated in its entirety into this application.

TECHNICAL FIELD

The present invention relates to a server selection device, a server selection method, and a program.

BACKGROUND ART

At the time of web browsing, video browsing, or the like over the Internet, content is downloaded from a server or a content delivery network (CDN) installed by a content company. During that time, when congestion occurs due to centralized access or security attack to the server, the response speed of the server may decrease or the server may become completely unresponsive. Such deterioration is service quality may greatly affect the quality of experience of a user.

Therefore, there has been introduced a multi-server environment in which content is installed in each of a plurality of servers, so that when the communication quality of one server deteriorates, the content can be downloaded from another server. The "server" in the multi-server environment includes not only a server in the Internet, such as a server in the CDN, but also a server in an on-premises service.

Solutions for selecting a multi-server have already been commercialized by Conviva and Cedexis Inc. The solution provided by Conviva achieves delivery of content with higher communication quality by downloading content from a CDN with the highest throughput based on quality information of each CDN provided in real time (Non-Patent Literature 1). Openmix provided by Cedexis combines indexes such as throughput and costs and describes a selection logic as a program, so that the user can freely assemble a CDN selection algorithm (Non-Patent Literature 2). There has also been proposed a method of probabilistically selecting a CDN in the ratio of the most recent throughput (Non-Patent Literature 3).

CITATION LIST

Non-Patent Literature

Non-Patent Literature 1: [online], Internet <URL: https://www.cedexis.com/openmix/>
Non-Patent Literature 2: Liu, Xi and Dobrian, Florin and Mjlner, Henry and Jiang, Junchen and Sekar, Vyas and Stoica, ion and Mang, Hui, "A case for a coordinated internee video control plane," Proceedings of the ACM SIGCOMM 2012 Conference on Applications, Technologies, Architectures, and Protocols for Computer Communication, SIGCOMM 2012
Non-Patent Literature 3: Wamser, Florian and Hofner, Steffen and Seufert, Michaeland Tran-Gia, Phuoc, "Server and Content Selection for MPEG DASH Video Streaming with Client Information," Proceedings of the Workshop on QoE-based Analysis and Management of Data Communication Networks, Internet QoE 2017

SUMMARY OF THE INVENTION

Technical Problem

As shown above, the selection algorithm in the multi-server environment and an environment in which the selection is made are being prepared. However, these methods have a problem of not considering the possibility that the quality of CDN decreases probabilistically.

For example, it is assuming that a server A and a server B are present, the speed of the server A is a server having a speed of 50 Mbps nine out of ten times but only a speed of 100 kbps once out of ten times, and the speed of the server B is a server having a speed of 30 Mbps ten out of ten times. In this case, since the average throughput of the server A is 45.01 Mbps and the average throughput of the server B is 30 Mbps, when the existing method is applied, the server A with a higher average throughput is selected. However, in streaming type communications such as video browsing, so long as the throughput is stably high to some extent, there is no influence on the quality of experience even when the throughput is higher than the above throughput. Thus, from the viewpoint of the quality of experience, the server B should be selected.

The present invention has been made in view of the above points, and an object of the present invention is to enable the selection of a server less likely to affect the quality of experience.

Means for Solving the Problem

For solving the above problems, a server selection device includes: an acquisition unit that acquires communication environment information indicating communication environment and quality information indicating communication quality for each of communications made regarding each of a plurality of servers that are candidates for distribution of content to a client; a calculator that calculates a score reflecting probabilistic deterioration in communication quality for each of combinations between a server and communication environment information based on a history of the communication environment information and the quality information acquired by the acquisition unit; and a selector that selects a server to deliver content to the client based on the score calculated by the calculator.

Effects of the Invention

It is possible to enable the selection of a server less likely to affect the quality of experience.

BRIEF DESCRIPTION OF DRAWINGS

FIG. 3 is a diagram showing a configuration example of a server information table in the first embodiment.
FIG. 4 is a diagram showing a configuration example of a score information table in the first embodiment.

FIG. 5 is a diagram showing a configuration example of a quality information table.

FIG. 6 is a diagram for explaining how to hold data in a quality DB.

FIG. 7 is a diagram showing a configuration example of a server information table in a second embodiment.

FIG. 8 is a diagram showing a configuration example of a score information table in the second embodiment.

FIG. 10 is a diagram showing an example of rewriting of a playlist.

DESCRIPTION OF EMBODIMENTS

Embodiments of the present invention based on the drawings will be described below. In the following, the embodiments will be described based on any combination of the presence or absence of a probe, an allocation method, and a score calculation algorithm.

A probe is a device that regularly accesses each server to acquire quality information which is information indicating the communication quality of each server. The presence or absence of the probe means whether to use such a probe.

The allocation method refers to a method of allocating a server corresponding to a URL specified by a client device, and in the present embodiment, there are choices of a "DNS method," a "HTTP redirect method," and a "playlist method."

Details of each choice will be described later.

The score calculation algorithm refers to a calculation algorithm for a "score" that is utilized as an index at the time of selecting a server to be accessed by the client device, and in the present embodiment, there are two choices, a threshold method and a statistical method.

The combination of the presence or absence of probes, the allocation method, and the score calculation algorithm is represented in the form of the following (the presence or absence of the probe, the allocation method, and the score calculation algorithm). However, for each element of the combination, in addition to the above method names, * (don't care) can also be specified. In the first to third embodiments, an example of (without probe, *, *) will be described. In the fourth embodiment, an example of (with probe, *, *) will be described.

In each embodiment described below, a situation is assumed where the URL of the content to be acquired by the client device can be identified. In the case of web browsing, the URL of the content to be acquired can be identified by being specified from the user or specified from Javascript (registered trademark) of a read web page. In the case of video browsing, the URL of the content to be acquired can be acquired by parsing a URL of a playlist or a URL of a chunk described in the playlist.

Figure 1:
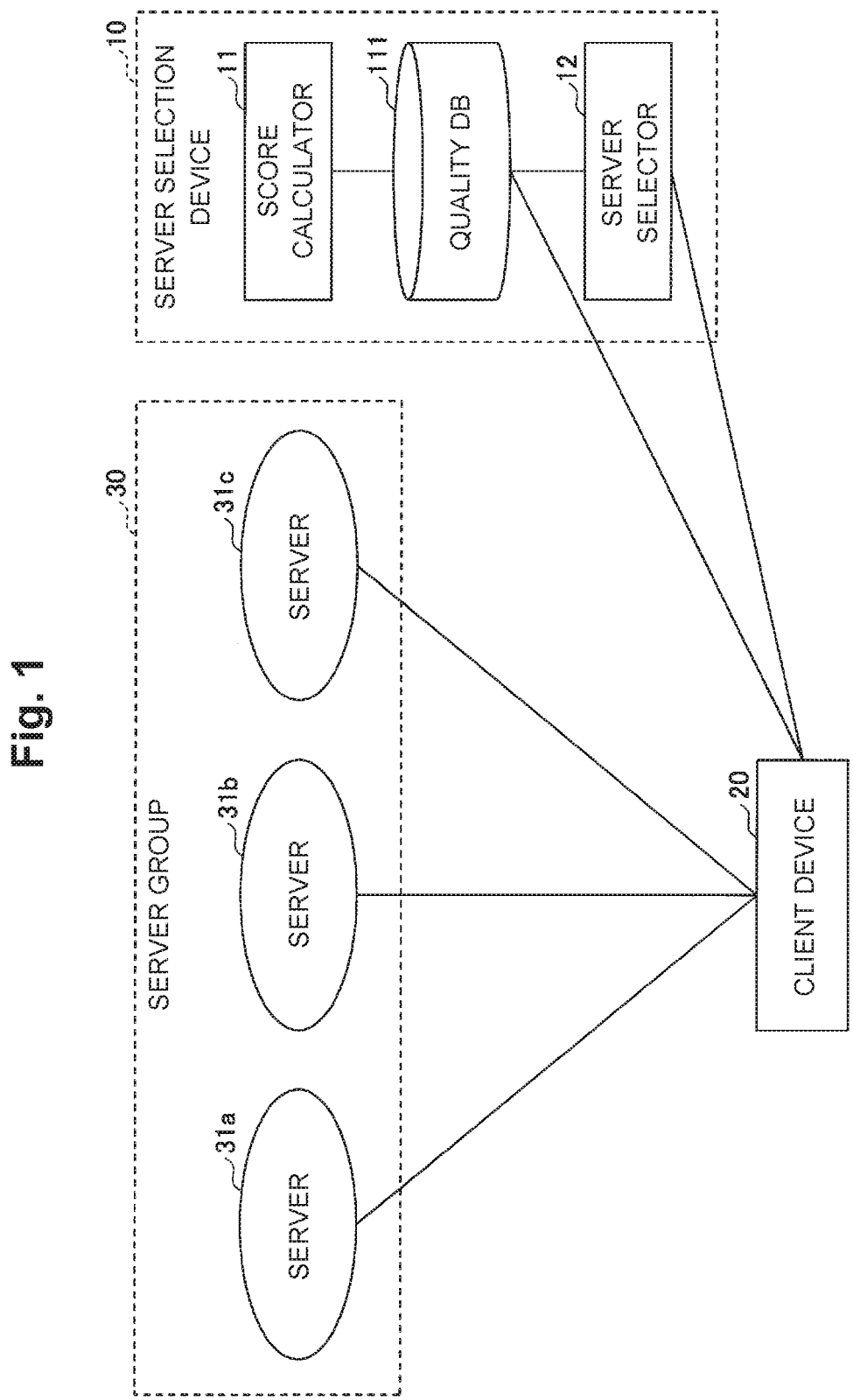
FIG. 1 is a diagram showing a configuration example of a multi-server environment system in a first embodiment.

FIG. 1 is a diagram showing a configuration example of a multi-server environment system in the first embodiment. In the first embodiment, the form of (without probe, DNS method, *) will be described. In FIG. 1, the multi-server environment system includes one or more client devices 20, a server group 30, a server selection device 10, and the like. The client device 20 is connected to the server group 30 and the server selection device 10 over the network such as the Internet.

The client device 20 is a terminal used by the user to browse web content, video content, and the like. For example, a personal computer (PC), a smartphone, a tablet terminal, or the like may be utilized as the client device 20.

The server group 30 is a set of a plurality of servers 31 (servers 31a to 31c) in the multi-server environment. Each server 31 delivers content requested from the client device 20. Note that the server 31 may be a server 31 in the Internet as a server 31 in a CDN or may be a server 31 in an on-premises service.

The server selection device 10 is one or more computers that perform the processing of selecting, from the server group 30, a server 31 with a relatively low possibility that quality of experience regarding content browsing or viewing decreases probabilistically (i.e., a server 31 with a low possibility of affecting the quality of experience). The server selection device 10 may be disposed anywhere so long as being communicable with the client device 20. For example, the server selection device 10 may be disposed in a company in which the client device 20 is disposed, or may be disposed on the Internet.

In FIG. 1, the server selection device 10 includes a score calculator 11, a server selector 12, and a quality DB 111. The score calculator 11 performs calculation of scores of the respective servers 31, and the like. Based on the scores, the server selector 12 selects the server 31 with a relatively low possibility that the quality of experience regarding content browsing or viewing decreases probabilistically. The quality DB 111 is a database for storing information on the quality of communication for the client, device 20 to download content from each server 31. Note that the computers corresponding to the respective components of the server selection device 10 may be different from each other.

Figure 2:
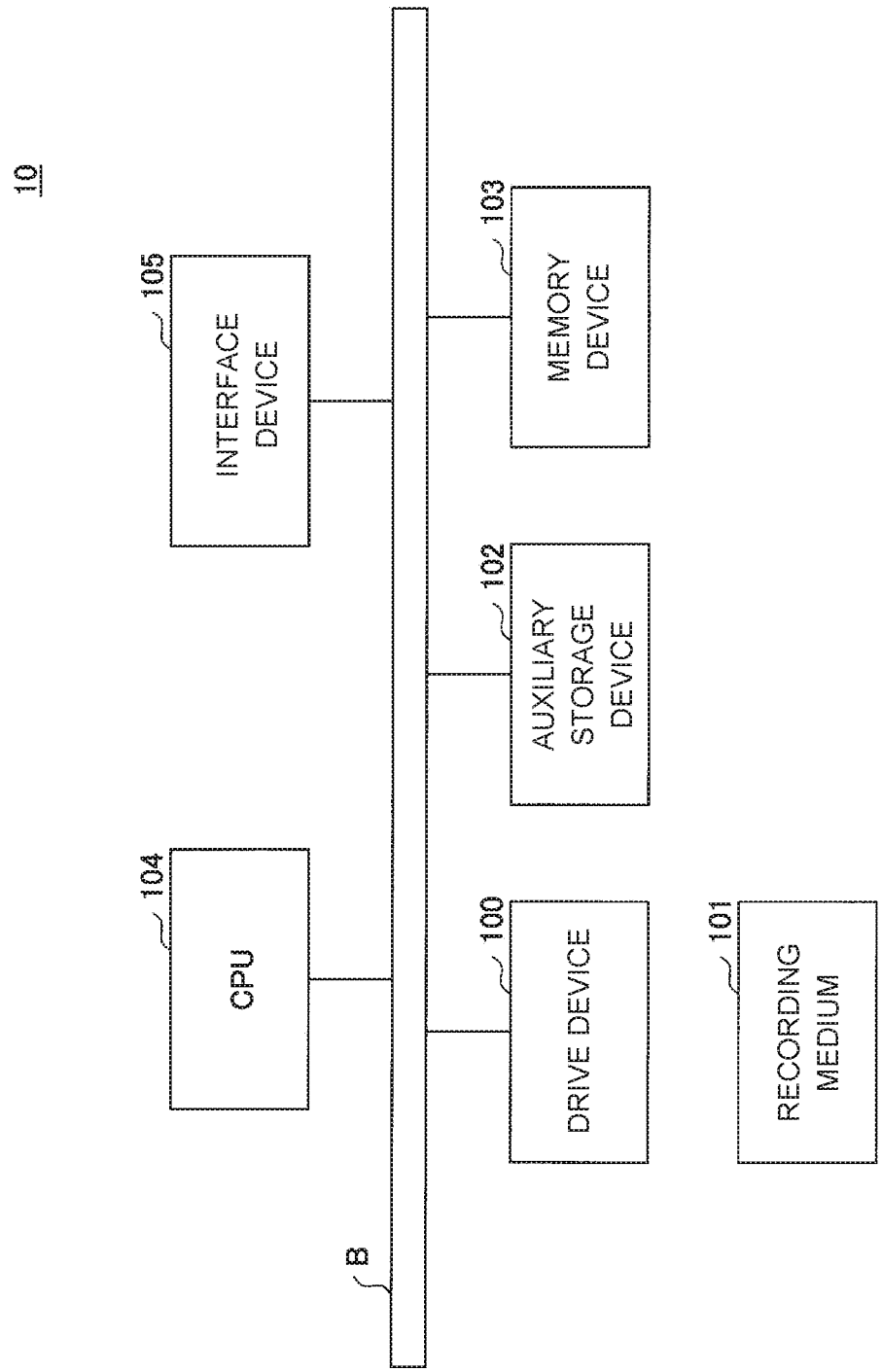
FIG. 2 is a diagram showing a hardware configuration example of a computing device in the first embodiment.

FIG. 2 is a diagram showing a hardware configuration example of the server selection device 10 in the first embodiment. The server selection device 10 of FIG. 2 includes a drive device 100, an auxiliary storage device 102, a memory device 103, a CPU 104, an interface device 105, and the like, which are connected to each other through a bus B.

A program for achieving processing in the server selection device 10 is provided by a recording medium 101 such as a CD-RCM. When the recording medium 101 storing the program is set to the drive device 100, the program is installed from the recording medium 101 into the auxiliary storage device 102 via the drive device 100. However, the program does not have to be installed from the recording medium 101, but the program may be downloaded from other computers over the network. The auxiliary storage device 102 stores necessary files, data, and the like, while storing the installed program.

When there is an instruction to start up the program, the memory device 103 reads the program from the auxiliary storage device 102 and stores the program. The CPU 104 executes a function concerning the server selection device 10 in accordance with the program stored in the memory device 103. The interface device 105 is used as an interface for connecting to the network.

Note that the score calculator 11 and the server selector 12 in FIG. 1 are achieved by processing where the CPU 104 is caused to execute by one or more programs installed in the server selection device 10. The quality DB 111 can be achieved using, for example, a storage device or the like that is connectable to the auxiliary storage device 102 or the server selection device 10 over the network.

Hereinafter, a processing procedure that is performed in the first embodiment will be described with reference to FIG. 1.

Step S1) The client device 20 transmits a URL to be accessed and communication environment information indicating the communication environment of the client to the server selector 12.

Step S2) The server selector 12 extracts server candidates (delivery candidates for content to the client device 20) corresponding to the URI, transmitted from the client device 20 (hereinafter referred to as "target URL") with reference to a server information table stored in advance in the quality DB 111.

FIG. 3 is a diagram showing a configuration example of the server information table in the first embodiment. As shown in FIG. 3, an IP address of an access destination is stored in association with the URL in the server information table in the first embodiment. Here, the relationship between the URL and the IF address of the access destination is one-to-many. Thus, in step S2, a plurality of IP addresses of access destinations are extracted as the server candidates corresponding to the target URL. An "allocation method" to identify the server candidates corresponding to the target URL by using IP addresses is referred to as a "DNS method."

For example, when the target URL is "http://aaa.com," as the server candidates, "11.11.11.11," "22.22.22.22," and "33.33.33.33" are extracted.

Step S3) From the score information table stored in the quality DB 111, the server selector 12 acquires a record concerning the same communication environment information as the communication environment information of the client device 20 (hereinafter referred to as "client communication environment information") among the scores of the respective server candidates extracted in step S2.

FIG. 4 is a diagram showing a configuration example of the score information table in the first embodiment. As shown in FIG. 4, for each combination of the server 31 and the communication environment information, the score calculated regarding the combination is stored in the score information table.

Here, the communication environment information refers to information distinguishing the communication environment (indicating the communication environment). For a fixed system line, the communication environment information is information made up of a use ISP and an area, and for a mobile system line, the communication environment information is information made up of some or all of a carrier, a cell ID, a base station ID, and location information in the score information table of FIG. 4, columns of "element 1" to "element 3" correspond to the components of the communication environment information. That is, for fixed system line, for example, the use ISP and the area are stored in the "element 1," and the "element 2," and for the mobile system line, for example, the carrier, the cell ID, and the base station ID are stored in the "element 1," the "element 2," and the "element 3."

The server selector 12 determines whether the communication environment information is the same or not in such a manner as follows. When the client communication environment information is the communication environment information of the fixed system line, in the score information table, the server selector 12 searches records where the ISP and the area match the client communication environment information, and then sequentially searches records where the ISP matches the client communication environment information, to take the first hit communication environment information as the client communication environment information. When the client communication environment information is the communication environment information of the mobile system line, the search unit searches records where the carrier, the base station ID, and the cell ID match the client communication environment information, and then sequentially searches records where the carrier and the base ID match the client communication environment information, and records where the carrier matches the client communication environment information, to take the first hit communication environment information as the client communication environment information.

Thus, for example, when the server candidates are "11.11.11.11," "22.22.22.22," and "33.33.33.33," and the client communication environment information is "CarrierA," "eNBA," and "CellA," the records of item numbers 1, 5, and 9 are acquired in FIG. 4.

Step S4) The server selector 12 acquires a "server" value (IP address; of the record with the maximum "score" value (hereinafter referred to as "target record") among the acquired records. That is, the server 31 with the maximum score is selected. In the present embodiment, a larger score means a less possibility that the quality deteriorates probabilistically.

Step S5) The server selector 12 returns the acquired IP address to the client device 20.

Step S6) The client device 20 accesses the IP address returned from the server selection device 10. As a result, the user can browse the content.

Step S7) For example, after the completion of the content browsing by the user, the client device 20 transmits, to the quality DB 111, an access time, an IP address of an access destination, a URL of the access destination, client communication environment information, and quality information such as a measured delay and a throughput. The quality DIB 111 stores the transmitted quality information into a quality information table.

FIG. 5 is a diagram showing a configuration example of the quality information table. As shown in FIG. 5, for each access to any server 31 by the client device 20 (download of content from any server 31), an access time, an IP address of an access destination, a URL of the access destination, communication environment information (client communication environment information), and quality information such as a delay and a throughput are stored into the quality information table. That is, for the communication with any server 31 by the client device 20, the history of communication environment information, the quality information, and the like are stored into the quality information table. Although omitted in FIG. 5, the quality information may include information (e.g., jitter, etc.) in addition to the delay and the throughput.

Note that the details of the communication environment information transmitted by the client device 20 vary among Android (registered trademark), iOS (registered trademark), and the fixed system line. Accordingly, how to hold the elements 1 to 3 constituting the communication environment information in the quality information table of the quality DB 111 may be changed in accordance with Android (registered trademark), iOS (registered trademark), and the fixed system line, as shown in FIG. 6. FIG. 6 shows an example where keys are set in sequence of the server 31, the carrier, the base station ID, and the cell ID for Android (registered trademark) ("A" in FIG. 6), in sequence of the server 31, the carrier, and the location information for iOS (registered trademark) ("I" in FIG. 6), and in sequence of the ISP and the area for the fixed system line (no value in the element 3), and data is awaited. The area of the fixed system line can be acquired by conversion from the IP address with geoIP.

In the above, the example has been shown where all the client devices 20 always transmit the quality information to the quality DB 111, but all the client devices 20 may not always transmit the quality information. For example, only some of the client devices 20 may transmit the quality information, or such a form can be taken that all the client devices 20 do not transmit the quality information, and the server 31 is selected using the quality information stored in the quality information table (FIG. 5) in some way.

Subsequently, a description will be given of a method of calculating the score in accordance with the communication environment information of each server 31 by using the quality information table.

In the present embodiment, there are two types of score calculation methods, which are a threshold method and a statistical method, and either method may be selected. Further, the maximum window size w is set in advance, and only a record of the past w hours is utilized. The opportunity of the score calculation is optional, and the score calculation may be performed on a regular basis (e.g., every other day), or the like.

The threshold method is a method of setting the score by using a negative double value of the frequency probability that the quality information of the past throughput, delay, jitter, or the like matched by the communication environment information is less than a pre-set threshold Th (i.e., the probability that the quality information is worse than the threshold Th), or by using the average value of intervals between times when the quality information is less than the threshold Th. For example, it is assumed that the details of the quality information table are as shown in FIG. 5: the time at which the score calculation was started is "2018.1.1 14:00:00," w is 1, and the threshold Th with respect to the throughput is 1000. First, there will be shown an example of calculating a score with respect to conditions that the server 31 is "11.11.11.11" and the communication environment information is "CarrierA, eNBA, CellA" (hereinafter referred to as "target condition"), corresponding to item number of the score information table (FIG. 4).

In this case, in the quality information table (FIG. 5), the score calculator 11 extracts, as calculation targets, three records of item number 2, 3, and 4 where the communication environment information matches all the communication environment information for the target condition among the records after 13:00:00 corresponding to the records for the past w (w=1) hour from the start time "2018.1.12018.1.1" of the score calculation.

Subsequently, the score calculator 11 compares the throughput in each of the three records to Th=1000 to specify that the number of records where the throughput is less than Th is two and that the number of records where the throughput is Th or more is one.

Then, the score calculator 11 calculates: (the frequency probability that throughput is less than Th)=2÷3≈0.66, and takes a negative double value of the frequency probability, −0.66, as the score of the server 31 "11.11.11.11" and the communication environment information "CarrierA, eNBA, CellA."Therefore, in this case, the score calculator 11 stores −0.66 for the "score" of the record corresponding to the target condition in the score information table. This corresponds to an example in FIG. 4 where the average value of the time intervals of the access times in the three records is taken as the score.

Next, there will be shown an example of calculating a score with respect to conditions that the server 31 is "11.11.11.11" and the communication environment informa-tion is "CarrierA, *, *" (hereinafter referred to as "target condition"), corresponding to item number 3 of the score information table (FIG. 4).

In this case, in the quality information table (FIG. 5), the score calculator 11 extracts, as a calculation target, a record group of item numbers 2 to 9 where at least the "element 1 (carrier)" matches "Carrier A" out of the elements of the communication environment information among the records after 13:00:00 corresponding to the records for the past w (w=1) hour from the start time "2018.1.1 14:00:00" of the score calculation.

Subsequently, the score calculator 11 compares the throughput for each record included in the record group to Th=1000 to specify that the number of records where the throughput is less than Th is four and that the number of records where the throughput is Tb or more is four.

Then, the score calculator 11 calculates: (the frequency probability that throughput is less than Th)=4÷8≈0.5, and takes a negative double value of the frequency probability, −0.5, as the score of the server 31 "11.11.11.11" and the communication environment information "CarrierA, *, *."

Therefore, in this case, the score calculator 11 stores −0.66 for the "score" of the record corresponding to the target condition in the score information table.

At each timing of the score calculation, the score calculator 11 performs the record extraction, the score calculation, and the like in the same manner also for other conditions in the score information table (FIG. 4).

On the other hand, the statistical method is a method where, with respect to a record group to be the calculation target, extracted in the same manner as in the threshold method, the score calculator 11 calculates an average μ, dispersion σ, and an "a" percentile ("a" is 0 or more and 100 or less of a real number) and takes a value of μ−bσ (b is a positive real number) or an "a" percentile value as the score.

As thus described, either the threshold method or the statistical method is an example of the calculation method for the score which reflects the probabilistic deterioration of the communication quality.

Next, a second embodiment will be described. In the second embodiment, a point different from those in the first embodiment will be described. The points not particularly mentioned in the second embodiment may be the same as in the first embodiment.

In the second embodiment, the form of (with probe, HTTP redirect method, *) will be described with reference to FIG. 1.

Step S1) The client device 20 transmits a URL to be accessed and communication environment information to the server selector 12.

Step S2) The server selector 12 extracts server candidates corresponding to the URL transmitted from the client device 20 (hereinafter referred to as "target UPI") with reference to a server information table stored in advance in the quality DB 111.

FIG. 7 is a diagram showing a configuration example of a server information table in the second embodiment. As shown in FIG. 4, a URL of an access destination is stored in association with the URL in the server information table in the second embodiment. Here, the relationship between the URL and the URI of the access destination is one-to-many. Thus, in step S2, a plurality of URLs of access destinations are extracted as the server candidates corresponding to the target URL. An "allocation method" to identify the server candidates corresponding to the target URL by using URIs is referred to as an "HTTP redirect method."

For example, when the target URI is "http://aaa.com," as the server candidates, "http://aaa-1.com," "http://aaa-2.com," and "http://aaa-3.com" are extracted.

Step S3) From the score information table (FIG. 4) stored in the quality DB 111, the server selector 12 acquires a record concerning the same communication environment information as the client communication environment information among the scores of the respective server candidates extracted in step S2.

FIG. 8 is a diagram showing a configuration example of a score information table in the second embodiment. The score information table of FIG. 8 is different from the score information table of FIG. 4 in that the "server" value is represented by the URL.

Note that the method of determining whether the communication environment information is the same or not is the same as in the first embodiment. Thus, for example, when the server candidates are http://aaa-1.com," "http://aaa-2.com," and "http://aaa-3.com," and the client communication environment information is "CarrierA," "eNBA," and "CellA," the records of item numbers 1, 5, and 9 are acquired in FIG. 8.

Step S4) The server selector 12 acquires a "server" value (URL) of the record with the maximum "score" value (hereinafter referred to as "target record") among the acquired records. That is, the server 31 with the maximum score is selected.

Step S5) The server selector 12 returns the acquired URL to the client device 20.

Step S6) The client device 20 accesses the URL returned from the server selection device 10. As a result, the user can browse the content. On this occasion, the client device 20 acquires the IP address of the accessed URI as the IP address of the access destination. Note that the client device 20 can acquire the IP address of the accessed URL by using a general domain name system (DNS).

Step S7) For example, after the completion of the content browsing by the user, the client device 20 transmits, to the quality DB 111, an access time, an IP address of the access destination, a URL of the access destination, client communication environment information, and quality information such as a measured delay and a throughput. The quality DB 111 stores the transmitted quality information into the quality information table (FIG. 5).

Next, a third embodiment will be described. In the third embodiment, a point different from those in the first or second embodiment will be described. The points not particularly mentioned in the third embodiment may be the same as in the first or second embodiment. In the third embodiment, the form of (without probe, playlist method, *) will be described. The use of the playlist method as the allocation method is limited to a case where an application employing an adaptive bitrate streaming (APR) type video distribution, such as HLS or DASH, is used in the client device 20.

Figure 9:
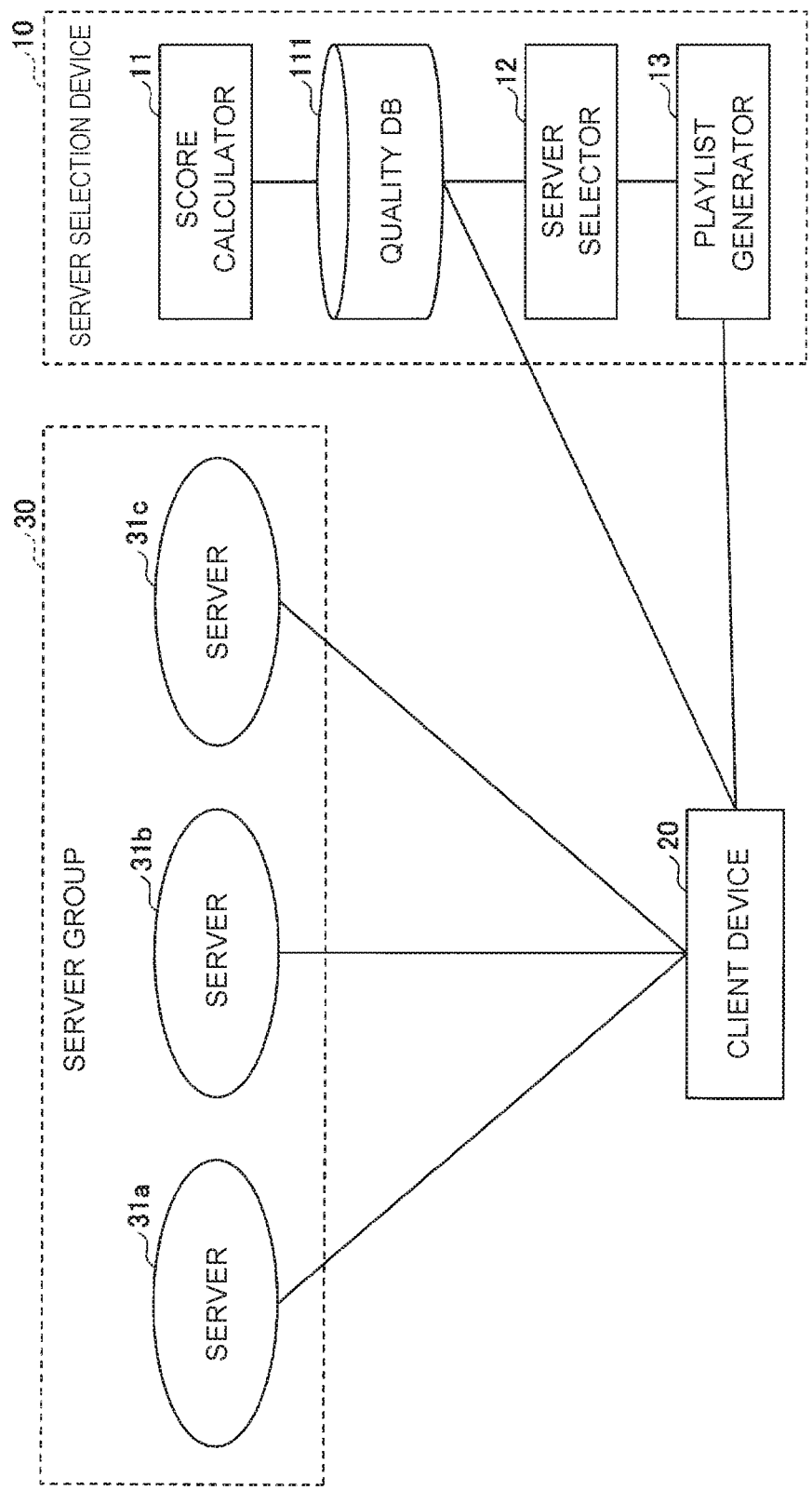
FIG. 9 is a diagram showing a configuration example of a multi-server environment system in a third embodiment.

FIG. 9 is a diagram showing a configuration example of a multi-server environment system in the third embodiment. In FIG. 9, the same portions as those in FIG. 1 are marked with the same numerals, and the description thereof is omitted.

In FIG. 9, the server selection device 10 further includes a playlist generator 13. The playlist generator 13 is achieved by processing where the CPU 104 is caused to execute by one or more programs installed in the server selection device 10.

Hereinafter, a processing procedure that is performed in the third embodiment will be described with reference to FIG. 9.

Step S1) The client device 20 transmits a URL of a video playlist specified by the user and client communication environment information to the playlist generator 13.

Step S2) The playlist generator 13 causes the server selector 12 to select the server 31 for each of URLs included in the playlist concerning the URI, received from the client device 20. That is, for each of the URLs, the server selector 12 selects the server 31 with the maximum score by applying step S2 to step S4 in the first embodiment (without probe, DNS method, *) or the second embodiment (without probe, HTTP redirect, *). The Playlist generator 13 performs rewriting of the selected server 31 to an IP address or a URL for the playlist.

FIG. 10 is a diagram showing an example of the rewriting of the playlist. FIG. 10 shows an example of a playlist before rewriting and a playlist after rewriting as an example of HTTP live streaming (HLS). In FIG. 10, each URL of the playlist before rewriting has been rewritten to "from hoge.com to fuga.com."

Step S3) The playlist generator 13 returns the playlist with each URL rewritten to the client device 20.

Step S4) The client device 20 plays a video based on the returned playlist.

Step S5) For example, after the completion of the video browsing by the user, the client device 20 transmits, to the quality DB 111, an access time, an IP address of the access destination, a URI, of the access destination, client communication environment information, and quality information such as a measured delay and a throughput. The quality DB 111 stores the transmitted quality information into the quality information table (FIG. 5).

Next, a fourth embodiment will be described. In the fourth embodiment, a point different from those in the first, second, or third embodiment will be described. For points not particularly mentioned in the fourth embodiment may be the same as in the first, second or third embodiment. In the fourth embodiment, the form of (with probe, *, *) will be described.

Figure 11:
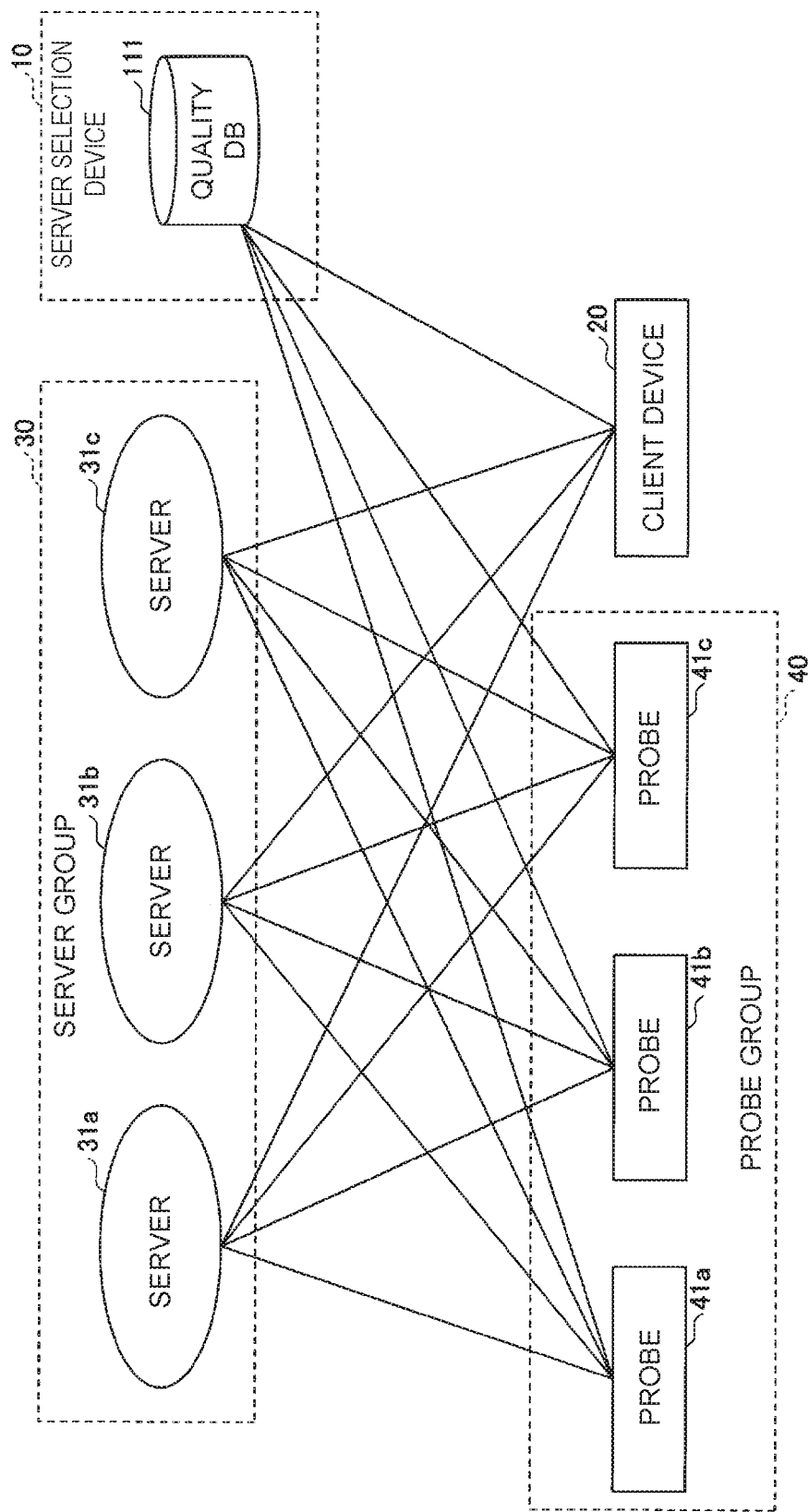
FIG. 11 is a diagram showing a configuration example of a multi-server environment system in a fourth embodiment.

FIG. 11 is a diagram showing a configuration example of a multi-server environment system in the fourth embodiment. In FIG. 11, the multi-server environment system includes a probe group 40 that is a set of probes 41. A probe 41a to a probe 41c included in the probe group 40 (referred to as "probe 41" when not distinguished) are connected to the server group 30 and the server selection device 10 over the network. As for the server selection device 10 of FIG. 11, the score calculator 11, the server selector 12, and the playlist generator 13 are omitted for convenience.

In the fourth embodiment, as compared to the case without the probe (first to third embodiments), only a method of updating the quality information table in the quality DB 111 is different. Each probe 41 is not synchronized with a request from the client device 20, but regularly accesses each server 31 to acquire the quality information of each server 31. Each probe transmits the acquired quality information to the server selection device 10. The server selection device 10 stores the received quality information into the quality information table. In the fourth embodiment, since the quality information is acquired from the probe 41, the quality information does not have to be transmitted from the client device 20.

As described above, according to the above embodiments, the probability of rapid degradation in quality is calculated as a score by using the quality information at the time of access to (at the time of communication with) each server 31 in the past. When the URL from the client device 20 is specified, among the server candidates corresponding to the URL, the server 31 with the maximum score in the same communication environment as the communication environment of the client device 20 is selected as the access destination. Therefore, according to the present embodiment, it is possible to enable the selection of the server 31 that reduces the possibility of affecting the quality of experience (the server 31 that can minimize the possibility of significant deterioration in quality of experience). As a result, as compared to the case of applying the conventional server selection method, it is possible to achieve video distribution and Web browsing with higher quality of experience.

In each of the above embodiments, the server selector 12, the playlist generator 13, and the like are examples of the acquisition unit. The score calculator 11 is an example of the calculator. The server selector 12 is an example of the selector.

While the embodiments of the present invention have been described in detail above, the present invention is not limited to such specific embodiments, but various deformations and changes can be made within the scope of the gist of the present invention described in the claims.

REFERENCE SIGNS LIST 10 server selection device
11 score calculator
12 server selector
13 playlist generator
20 client devices
30 server group
31 server
40 probe group
41 probe
100 drive device
101 recording medium
102 auxiliary storage device
103 memory device
104 CPU
105 interface device
111 quality DB
B bus

The invention claimed is:

1. A server selection device comprising:
an acquisition unit, including one or more processors, configured to acquire communication environment information indicating a communication environment of a client device and quality information indicating communication quality for each of a plurality of servers that are candidates for delivering content to the client device;
a calculator, including one or more processors, configured to calculate a plurality of scores based on a history of the communication environment information and the quality information acquired by the acquisition unit, wherein each of the plurality of scores is calculated based on at least a plurality of communication records and whether a respective quality parameter in each of the plurality of communication records is below a threshold parameter, and reflects a probability of deterioration in communication quality associated with a respective one of the plurality of servers and the communication environment of the client device as indicated by a respective combination of one or more elements of the communication environment information; and
a selector, including one or more processors, configured to select, from the plurality of servers, a server to deliver content to the client based on the plurality of scores calculated by the calculator.

2. The server selection device according to claim 1, wherein the calculator is configured to calculate each of the plurality of scores based on a probability that the communication quality associated with the respective one of the plurality of servers and the communication environment of the client device as indicated by the respective combination of one or more elements of the communication environment information is worse than a threshold.

3. The server selection device according to claim 1, wherein the calculator is configured to calculate each of the plurality of scores based on a time interval between communications for which the communication quality for the respective one of the plurality of servers as indicated by the quality information is worse than a threshold.

4. The server selection device according to claim 1, wherein the acquisition unit is configured to acquire the quality information from the client device or from a device different from the client device.

5. A server selection method executed by a computer, the method comprising:
an acquisition step of acquiring communication environment information indicating a communication environment of a client device and quality information indicating communication quality for each of a plurality of servers that are candidates for delivering content to the client device;
a calculation step of calculating a plurality of scores based on a history of the communication environment information and the quality information acquired in the acquisition step, wherein each of the plurality of scores is calculated based on at least a plurality of communication records and whether a respective quality parameter in each of the plurality of communication records is below a threshold parameter, and reflects a probability of deterioration in communication quality associated with a respective one of the plurality of servers and the communication environment of the client device as indicated by a respective combination of one or more elements of the communication environment information; and
a selection step of selecting, from the plurality of servers, a server to deliver content to the client device based on the plurality of scores calculated in the calculation step.

6. A non-transitory computer readable medium storing instructions that when executed by a computer cause the computer to perform steps comprising:
an acquisition step of acquiring communication environment information indicating a communication environment of a client device and quality information indicating communication quality for each of a plurality of servers that are candidates for delivering content to the client device;
a calculation step of calculating a plurality of scores based on a history of the communication environment information and the quality information acquired in the acquisition step, wherein each of the plurality of scores is calculated based on at least a plurality of communication records and whether a respective quality parameter in each of the plurality of communication records is below a threshold parameter, and reflects a probability of deterioration in communication quality associated with a respective one of the plurality of servers and the communication environment of the client device as indicated by a respective combination of one or more elements of the communication environment information; and a selection step of selecting, from the plurality of servers, a server to deliver content to the client device based on the plurality of scores calculated in the calculation step.

7. The server selection method according to claim 5, wherein the calculation step comprises calculating each of the plurality of scores based on a probability that the communication quality associated with the respective one of the plurality of servers and the communication environment of the client device as indicated by the respective combination of one or more elements of the communication environment information is worse than a threshold.

8. The server selection method according to claim 5, wherein the calculation step comprises calculating each of the plurality of scores based on a time interval between communications for which the communication quality for the respective one of the plurality of servers as indicated by the quality information is worse than a threshold.

9. The server selection method according to claim 5, wherein the acquisition step comprises acquiring the quality information from the client device or from a device different from the client device.

10. The non-transitory computer readable medium according to claim 6, wherein the calculation step comprises calculating each of the plurality of scores based on a probability that the communication quality associated with the respective one of the plurality of servers and the communication environment of the client device as indicated by the respective combination of one or more elements of the communication environment information is worse than a threshold.

11. The non-transitory computer readable medium according to claim 6, wherein the calculation step comprises calculating each of the plurality of scores based on a time interval between communications for which the communication quality for the respective one of the plurality of servers as indicated by the quality information is worse than a threshold.

12. The non-transitory computer readable medium according to claim 6, wherein the acquisition step comprises acquiring the quality information from the client device or from a device different from the client device.

* * * * *